United States Patent [19]
Brandt et al.

[11] 3,787,636
[45] Jan. 22, 1974

[54] MAGNETIC RECORDING AND PLAYBACK SYSTEM FOR USE WITH RECORDING RECORDS ADAPTED FOR USE IN CONJUNCTION WITH A PHOTOGRAPH

[75] Inventors: Edison R. Brandt, Boca Raton, Fla.; Christopher R. Rice, Wakefield, Mass.

[73] Assignee: Polaroid Corporation, Cambridge, Mass.

[22] Filed: Apr. 18, 1972

[21] Appl. No.: 245,277

Related U.S. Application Data

[63] Continuation of Ser. No. 7,809, Feb. 2, 1970.

[52] U.S. Cl. ............ 179/100.2 T, 179/100.2 CA, 179/100.2 Z, 274/4 H, 274/4 J

[51] Int. Cl. ............ G11b 21/06

[58] Field of Search ......... 179/100.2 T, 100.2 R, 100.2 Z, 179/100.2 CA; 274/4 M, 4 J, 13 A

[56] References Cited

UNITED STATES PATENTS

| | | | |
|---|---|---|---|
| 3,000,638 | 9/1961 | Dennis | 274/4 J |
| 3,214,175 | 10/1965 | Nakamatsu | 179/100.2 T |
| 3,224,782 | 12/1965 | Isemura | 179/100.2 R |
| 2,690,340 | 9/1954 | Harrison et al. | 274/13 A |
| 2,554,347 | 5/1951 | Rouse | 274/13 A |
| 3,682,482 | 8/1972 | Holmes | 274/13 A |

*Primary Examiner*—Vincent P. Canney
*Assistant Examiner*—Robert S. Tupper
*Attorney, Agent, or Firm*—William A. Danchuk

[57] ABSTRACT

Magnetic sound recording and reproducing system incorporating a rectangular recording member having a planar face within which is formed a spirally grooved track. A magnetic recording surface surrounds the spiral track and the member is arranged for attachment to the rearward side of a photograph. The recording member is receivable within a recording-playback unit which rotates a magnetic head about the magnetic recording surface of the recording member. The locus of the magnetic head is established by a connection of a follower pin with a spiral track.

11 Claims, 7 Drawing Figures

INVENTORS
EDISON R. BRANDT
and
CHRISTOPHER R. RICE
BY Brown and Mikulka
and
Gerald L. Smith
ATTORNEYS INVENTORS
EDISON R. BRANDT
and
CHRISTOPHER R. RICE
BY Brown and Mikulka
and
Gerald L. Smith
ATTORNEYS INVENTORS
EDISON R. BRANDT
and
CHRISTOPHER R. RICE
BY Brown and Mikulka
and
Gerald L. Smith
ATTORNEYS

MAGNETIC RECORDING AND PLAYBACK SYSTEM FOR USE WITH RECORDING RECORDS ADAPTED FOR USE IN CONJUNCTION WITH A PHOTOGRAPH

This application is a continuation of of Ser. No. 7,809 filed Feb. 2, 1970 and relates to audio-visual recording systems and, more particularly, to a magnetic sound recording and reproducing system for recording audio information upon the rearward supporting structure of a photograph.

BACKGROUND

Systems which create an audible information record somewhat coincidentally with the production of a corresponding photographic record have, in their more specialized forms, achieved a sophisticated technical status. However, little practical progress has been achieved in the development of inexpensive recording systems which may be used contemporaneously with the production of casual still photographs, for instance those popular in conventional amateur photography.

To meet marketing criteria, the recording and playback units of such systems should be light in weight and of a small or compact dimension appropriate for transporting the unit in a convenient pocket of a garment. Further, magnetic recording members used with the system preferably should become a permanent component of the photograph produced by a camera and should be available for recording immediately following or coincidently with the taking of a photograph. With the latter arrangement, sounds emanating from the photographic subject or technical data related to the subject can be recorded without significant error due to the time lapse otherwise occasioned by remote photographic processing. In providing a magnetic recording member designed to serve as a component of a completed photograph, it is necessary that the cost of the member should fall within a range commensurate with the costs involved in producing an amateur photograph. The latter criteria generally calls for a flat, disc-type recording member which may be adhesively affixed to a photograph or manufactured as part of a photographic product. To record upon the flat surface of the recording member, magnetic transducer systems are used which incorporate a magnetic head mounted for movement against the magnetic surface of the recording member along a predetermined recording pattern or trace. To permit the moving magnetic head to maintain full and continuous contact with the magnetic surface of the recording member, it has been the practice to form the magnetic surface over a supporting compliant layer of rubber or the like. The latter multi-component structure adds considerable cost to the manufacture of the recording member, thereby detracting from its practical use within the amateur photographic market.

Further criteria for the audio-visual systems now contemplated reside in the need not only for simplicity of operation but also for accuracy in deriving and subsequently registering with the above-described tracking pattern by a magnetic head assembly. For instance, any of the relatively inexpensive photograph-record member configurations should be capable of being replayed inter-changeably by all manufactured units, as opposed to being replayable only within the unit used for recording the original data. Such registration is difficult to achieve where the record member is provided as a flat magnetic surface and the recording-playback apparatus is designed under the low cost requirements of the amateur photographic market. Generally, proper registration between a recorded track and a magnetic head is derived with equipment, the manufacture of which requires several component assemblies of high precision and low allowable tolerances. The latter assembly and manufacturing considerations heretofore have hindered the development of popularly priced recording units of the variety now contemplated.

SUMMARY

The present invention is addressed to an audiovisual recording system the components of which are capable of high quality performance while being fabricable at costs commensurate with the requirements of the amateur photographic market.

Through the use of a simple and inexpensive recording member incorporating a spiral guide track in combination with a magnetic recording and playback apparatus having a rotatable magnetic head and follower assembly engageable with the spiral track, proper registration of the head with any magnetic track produced by the system is assured. As a further and important feature of the invention, the magnetic recording-playback unit of the system is designed such that only one simple component need be fabricated under close tolerances. This element of the assembly, however, is of such elementary design that precise fabrication is simply and economically achieved.

In one embodiment, the recording member of the inventive system is formed as a sheet of plastic, one planar face of which incorporates a spirally grooved guide track which is positioned concentrically with a magnetic recording surface. The recording member may be combined in laminar fashion with a photograph by adhesively uniting the back surface of a photograph with the back surface of the member. Alternately, the recording member may be formed as a component of a photographic film unit.

With the instant system, the presence of compliant layers of material intermediate the magnetic surface of the recording member and its plastic backing or support are unnecessary. As a consequence, the recording members are fabricable using high volume production techniques and can be produced at acceptably low unit costs.

When inserted within the receiving chamber of a record-playback unit, the spiral tracking groove of the recording member will be automatically oriented for proper engagement with the follower portion of a magnetic transducer head-follower assembly. In a preferred embodiment, the follower portion is formed as an abrasion resistent pin which is copositioned within a secondary mounting in predetermined spaced relationship with a magnetic head. The secondary mounting is positioned for radial movement upon a turntable which, in turn, is rotatable somewhat concentrically with respect to the spirally grooved track of the recording member. By biasing the radial carriage assembly in a select radial direction with respect to the rotational center of the turntable, a simple reset feature is provided for assuring appropriate orientation of the magnetic head at the commencement of a recording or playback procedure. Return of the carriage assembly to its initial or starting position may be caused by the disengagement of the earlier described follower pin from the spirally grooved track. This disengagement is achieved by the simple procedure of removing the recording member from the recording-playback unit.

The recording-playback unit further features a receiving chamber designed to provide support about the magnetic surface of the recording member such that the magnetic head of the transducer assembly may be urged into contact with the magnetic surface under relatively high pressures. Because of the higher contact pressures of the magnetic head with this recording surface, the need for a compliant sub-structure beneath the recording surface is eliminated. Audio fidelity, however, is maintained at acceptably equivalent standards.

Another feature and object of the invention is to provide a magnetic sound recording and reproducing system including a recording member fabricable at low cost from inexpensive materials such as plastic or the like and having a planar face incorporating a magnetic surface and a spiral guide track. The recording member is dimensioned in accordance with a standard photograph size and is adhesively attachable thereto. The recording member and attached photograph are insertable within the receiving chamber of the housing of a recording and playback unit. The latter unit includes a first carriage mounted for rotary movement with respect to the face of the recording member. This carriage incorporates a secondary carriage upon which is mounted a follower engageable with the guide track of the recording member and a magnetic head engageable with the magnetic surface of the recording member when the latter is inserted within the housing. The secondary carriage arrangement is mounted for movement radially upon the carriage means so that the follower, when engaged with the spiral guide track, will cause the head to trace a corresponding spiral track about the magnetic surface of the recording member. A spring assembly is provided for urging the head and follower into slideable contact respectively with the aforedescribed spiral track and magnetic surface.

Further objects and advantages of the present invention will become readily apparent as the following detailed description of the invention unfolds and when taken in conjunction with the drawings.

Figure 1:
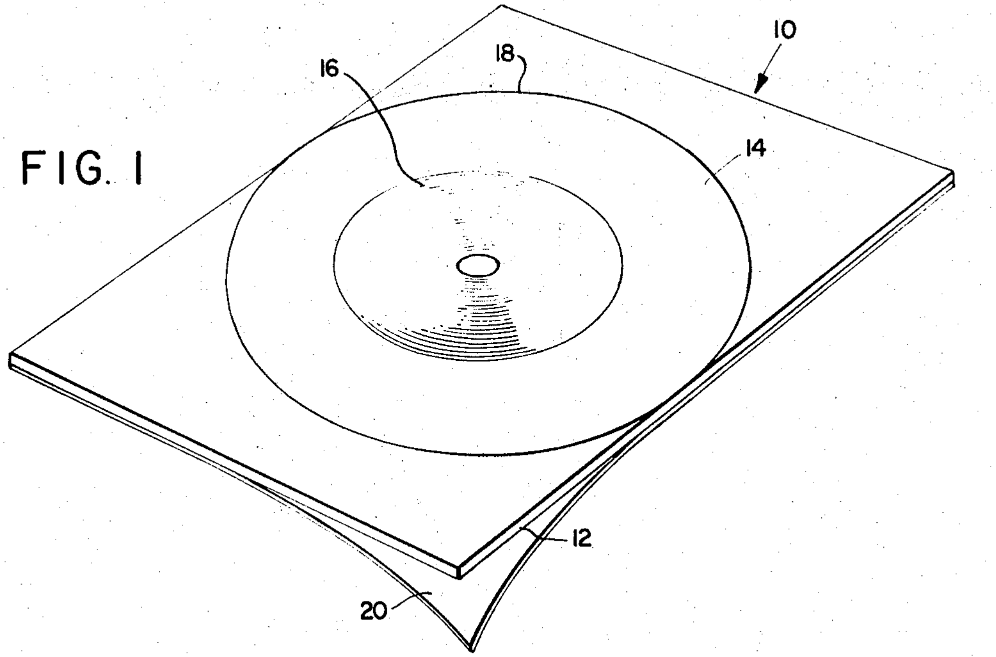
FIG. 1 is a pictorial representation of a recording member of the system of the invention, portions of which are deformed to reveal a laminar form of structure.

DETAILED DESCRIPTION:

Referring to FIG. 1, a recording member that serves as a component of the system of the invention is illustrated generally at 10. Member 10 is formed having a laminar configuration including a plastic base portion 12 over which is formed a thin magnetic surface 14. Surface 14 is formed of a material capable of retaining magnetically recorded information and, in common practice, is provided as a layer of a select iron oxide in combination with a suitable binding material. In the embodiment illustrated, surface 14 is deposited on a supporting sheet of paper or the like which, in turn, is adhesively affixed to the planar surface of base member 12. Centrally disposed within plastic base portion 12 is an integrally formed spirally grooved track 16. Track 16 may be formed simultaneously with the fabrication of base member 12, or may be formed by simple stamping procedures or the like. Magnetic surface 14 extends from the outer periphery of track 16 and is terminated at an annular boundary 18. The opposite face of base 12 may be used to support a photograph as at 20. For instance, the rear supporting surface of photograph 20 is simply mounted to base portion 12 with an adhesive.

From the foregoing, it may be seen that recording members as at 10 are amenable to high volume fabrication, preferably in sizes corresponding to the sizes of photographic prints. Relatively low unit cost production techniques are involved in the manufacture of the members 10, inasmuch as only two laminae are present in the structural configuration of the member. Note that no compliant layer is positioned intermediate the magnetic surface 14 and supporting plastic base portion 12. Where photographs are taken using cameras of the self-developing variety in which processing takes place as an adjunct to forming an exposure, photograph 20 may be adhesively affixed to base 12 as a final processing step within a very short period following exposure.

Figure 2:
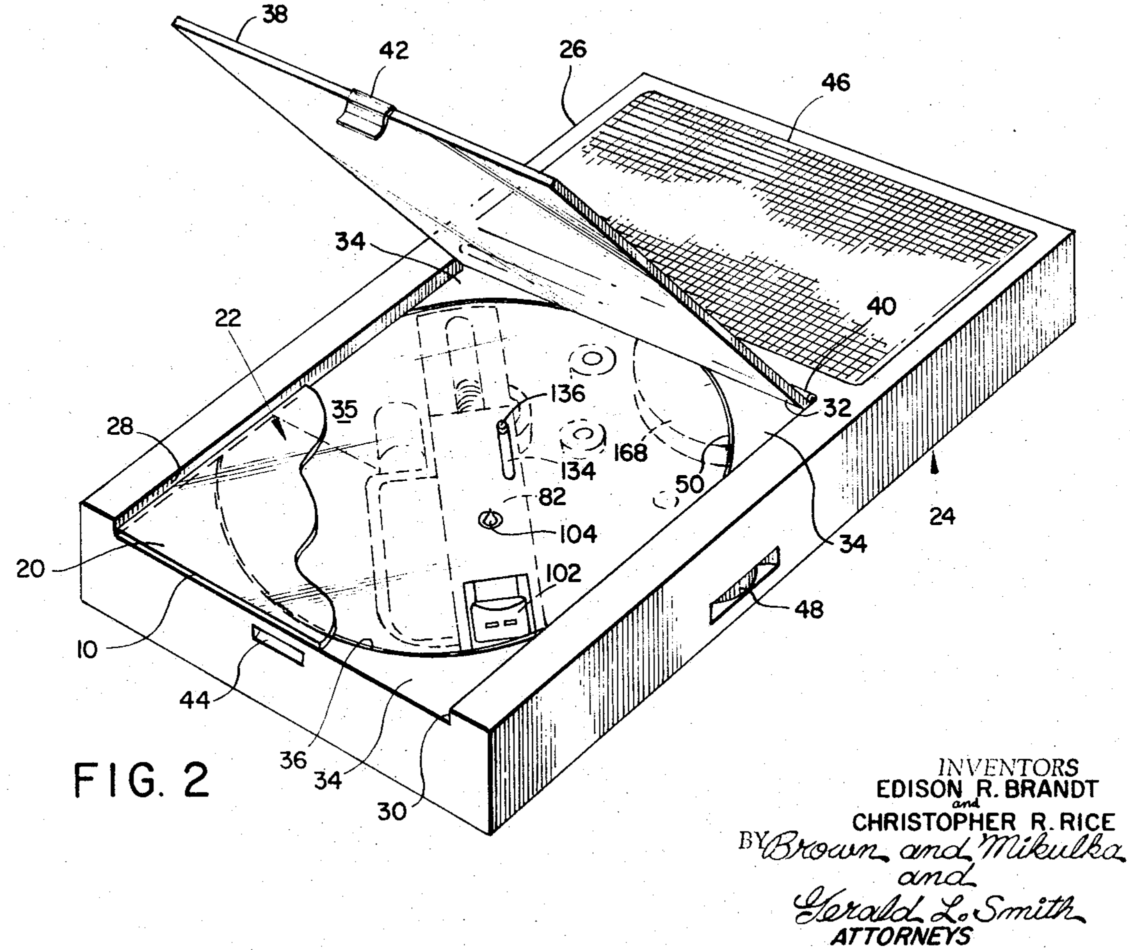
FIG. 2 is a pictorial representation of a recording-playback unit according to the present invention and having portions broken away to reveal the internal arrangement of its components.

The relatively thin, planar recording member 10 is dimensioned for insertion within and operative association with a recording-playback unit as illustrated in FIG. 2 at 24. Unit 24 is dimensioned so as to be conveniently carried in the pocket of a garment or the like. Accordingly, it may assume the shape of a thin parallelepiped. Recording member 10 is insertable within a receiving chamber 22 fashioned within the upward side 26 of unit 24. This receiving chamber is fashioned having side walls 28, 30 and 32 and a bottom planar support platform 34. Bottom platform 34 is configured to define an annular opening 35, the edge of which is shown at 36. Opening 35, defined by edge 36, serves to expose the receiving chamber 22 to internally disposed mechanisms of the unit 24. The relative spacing of sides 28, 30 and 32 about platform 34 are selected so as to permit a facile insertion of recording member 10, a portion of which is shown in inserted position, as well as to restrict a lateral movement or downward flexure of the member when it is in the operative position indicated. The receiving chamber 22 of unit 24 further includes a rigid, transparent top cover 38 which is hinged to upward side 26 at 40. During operation of unit 24, top cover 38 is rotated onto the receiving chamber 22 and functions to provide a surface-to-surface support holding recording member 10 within chamber 22. A spring-loaded latching member 42 engageable with a corresponding latching notch 44 holds top cover 38 in position appropriate for recording or playback operation.

When positioned within the receiving chamber in the orientation depicted in FIG. 2, recording member 10 is situated for operative cooperation with magnetic recording instrumentalities mounted within the interior of unit 24. These instrumentalities include transducer units, detector and amplification components, motorized drive systems, microphones and one or more speaker units. Conventional circuitry, speaker units, microphones and power supplies are used with the system of the invention and, accordingly, are not illustrated. Lattice type covering portion 46 is positioned as shown for permitting adequate acoustic transmission from a speaker unit and microphone disposed therebeneath. A manually actuated record-playback electrical switch 48 is shown disposed within one side of the unit 24.

When positioned for operation within the unit 24, recording member 10 will be "face down" such that the spiral track 16 as well as magnetic surface 14 may physically communicate with a magnetic head and related tracking assembly disposed within the boundaries of edge 36 of the annular opening 35 formed within support platform 34. For the most part, this opening is occupied by a turntable and carriage assembly which functions to support and rotate registration and magnetic transducer elements.

Figure 3:
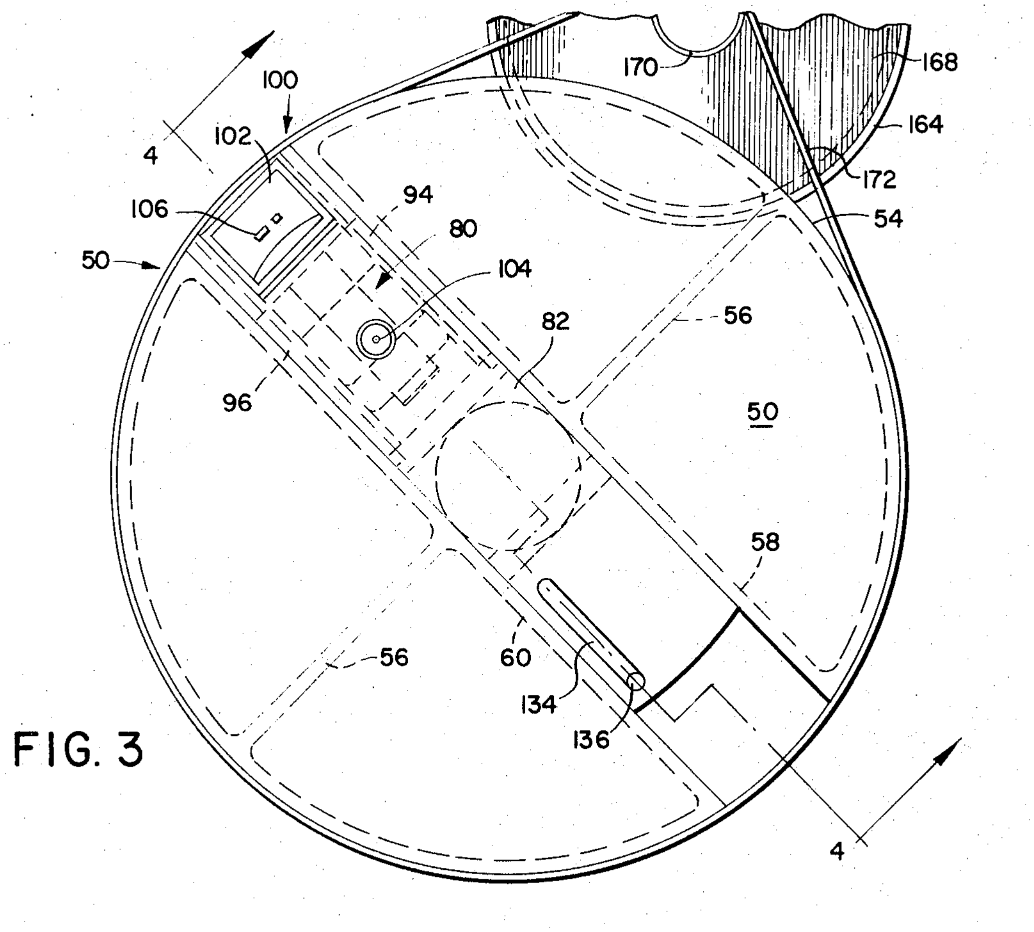
FIG. 3 is a front view of a turntable and carriage mounting assembly used with the recording-playback unit illustrated in connection with FIG. 2.
Figure 4:
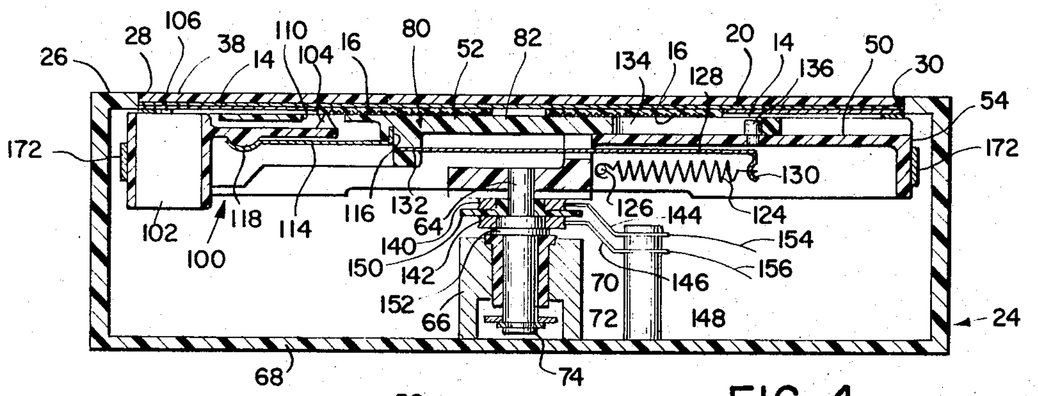
FIG. 4 is a sectional view of the recording-playback unit of FIG. 2, taken through the plane 4—4 in FIG. 3.

Referring to FIGS. 3 and 4, the structure of this turntable 50 is portrayed in detail. Turntable 50 is formed having a right cylindrical shape including a planar top surface 52. Surface 52 is situated in record-playback unit 24 at a position slightly below the planar support platform 34 of the unit's receiving chamber. Fashioned from a suitable plastic material, turntable 50 is generally hollow and is supported about its circumference by a peripheral drive surface 54. Internal support for surface 52 is provided by internally supporting ribs 56 and carriage ribs 58 and 60. Turntable 50 is fixedly mounted upon a cylindrical shaft 64 extending from its undercarriage along its axis of rotation. Shaft 64 is formed from a metallic, electrically conductive material and is rotatably-slidably mounted within a centrally bored boss 66 fixed, in turn, to the bottom panel 68 of the unit 24. Support from boss 66 for shaft 64 is provided through an electrically insulative intermediately journaled bearing 70.

Figures 6, 7:
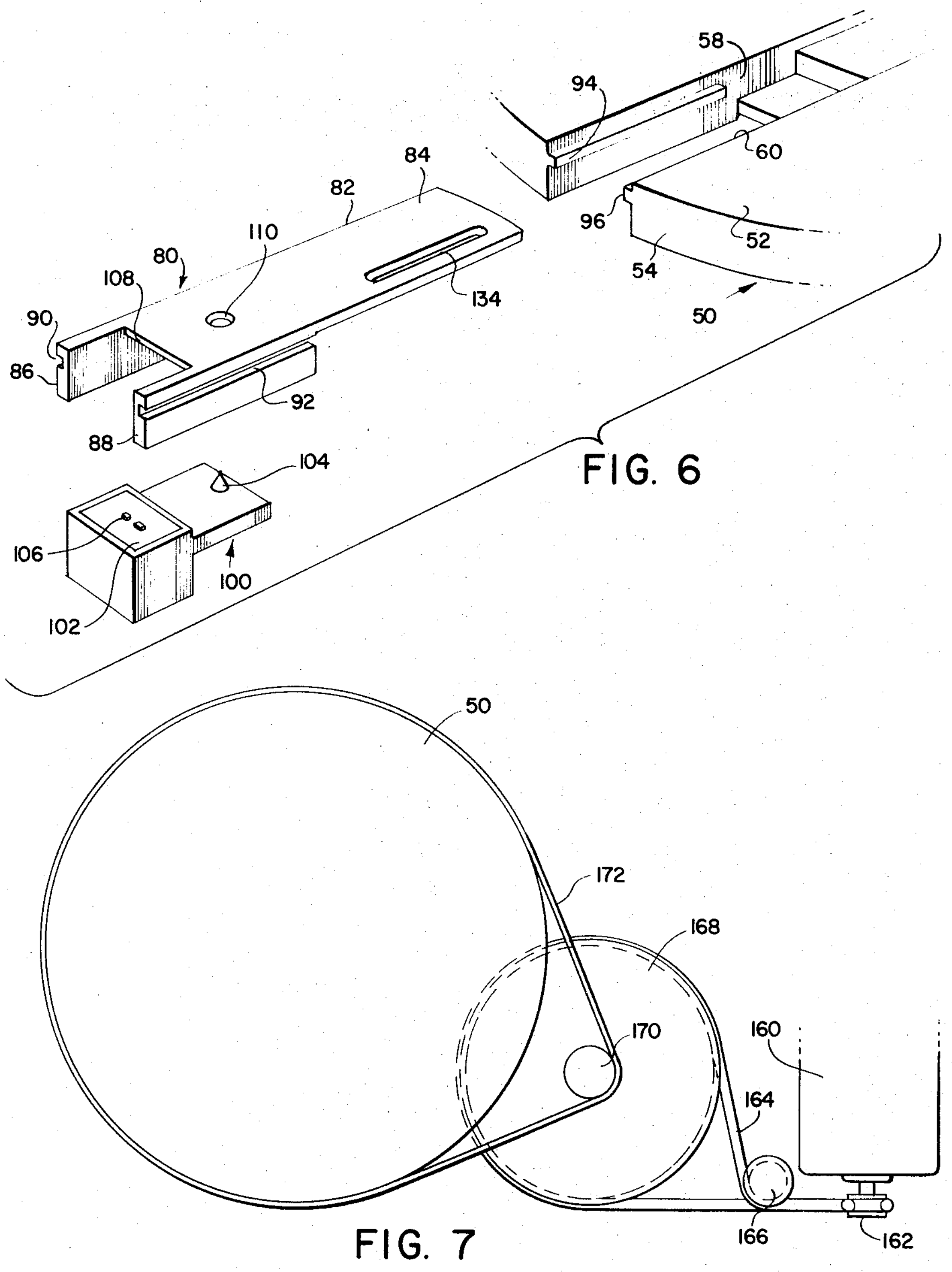
FIG. 6 is an exploded, pictorial representation of the carriage and follower-magnetic head mounting assembly of the invention.
FIG. 7 is a plan view of the motorized drive system used with the recording-playback unit illustrated in FIG. 2.

Referring additionally to FIG. 6, turntable 50 is configured to carry a radially disposed carriage assembly indicated generally at 80. Carriage assembly 80 includes a plastic, radially movable carriage member 82 having an uppermost portion 84 along with integrally formed side portions 86 and 88 extending perpendicularly therefrom. The latter side portions 86 and 88 are formed having longitudinally disposed rectangular keyways indicated respectively at 90 and 92. Keyways 90 and 92 are configured and dimensioned to be slidable over corresponding keys or ribs shown respectively at 94 and 96 formed, in turn, within respective supporting ribs 58 and 60 of turntable 50.

When inserted between the turntable slot defined between carriage mounting ribs 58 and 60, carriage member 82 is permitted radial movement from the axis of rotation of the turntable. The arrangement of slots 90 and 92 with ribs 94 and 96 permits such radial translation while affording extended support to the carriage member 82 enabling it to withstand relatively significant pressures in a direction perpendicular to the top surface 52 of turntable 50.

Carriage assembly 82 supports a head-follower assembly 100 at a position somewhat co-extensive with its side portions 86 and 88. Assembly 100 is preferably formed of a dimensionally stable and readily molded plastic material and functions to provide a mounting support for a magnetic transducer head at 102 and a follower pin 104. The tips or contact portions of pole members of magnetic head 102 are shown projecting from head 102 at 106. Tips 106 are spaced from follower pin 104 a distance selected to correspond with the radial distance from the outermost groove of track 16 and the outermost magnetic trace formed upon magnetic surface 14. When assembled with carriage member 82, the head-follower assembly 100 is positioned such that its head portion 102 extends into a rectangular opening 108 and its follower pin 104 extends into annular opening 110 of the assembly 82. Referring to FIG. 4, the head-follower assembly 100 is mounted in position by a leaf spring 114. Spring 114 is configured having a stationary end portion 116 fixed within the underside of carriage assembly 82 from which position it extends in cantilever fashion to a cylindrically formed tip 118. Tip 118 cooperates with a corresponding cylindrically shaped joining boss molded integrally within the lower surface of assembly 100. Thus mounted, the head portion 102 as well as follower pin 104 of assembly 100 are biased respectively through openings 108 and 110. A more detailed description of the mounting of the head-follower assembly 100 within a carriage as at 82 is provided in a copending application for United States patent entitled "Magnetic Recording Apparatus Having An Impact Resistant Head Mounting Feature" by William A. Holmes (Ser. No. 7810, filed of even date herewith and assigned to the assignee of the instant application.

Carriage member 82 is slidable radially within the channel defined between carriage mounting ribs 58 and 60. The carriage assembly is continuously urged toward the periphery of turntable 50 by virtue of its engagement with a helical spring 124, one end of which is attached to a pin 126 fixed, in turn, to the undercarriage of turntable 50. The opposite side of spring 124 is attached to a rod 128 by engagement with a hooked end portion thereof on 130. Rod 128 is slidably supported within the undercarriage portion of turntable 50 and is connected at 132 to radial carriage assembly 82. With the arrangement thus described, carriage 82 along with head-follower assembly 100 is continuously urged toward the outer periphery of the turntable 50. To limit the extent of its outward movement, an elongated slot 134 is formed within radial carriage assembly 82. A stud or pin 136 which is fixed to turntable 50 extends into slot 134. By virtue of the abutment of one end of slot 134 within pin 136, the radial outward movement of carriage assembly 82 is restricted to the circumferencial periphery of turntable 50.

Electrical interconnection between the magnetic transducer head 102 and electronic instrumentalities within the unit 24 is provided by a slip ring arrangement which functions in conjunction with the cylindrical shaft 64 of turntable 52. Two slip rings 140 and 142 are arranged on the shaft 64 in an orientation permitting their electrically conducting cooperation with corresponding spring wire brushes illustrated respectively at 144 and 146. Brushes 144 and 146 are mounted upon an electrically insulated post 148 extending from the base of unit 24. To electrically conduct from the head 102 to slip ring 142, an electrical lead (not shown) is connected from the head 102 to the electrically conductive shaft 64, thence into slip ring 142. Conduction in an oppositely polar sense is provided by a lead (not shown) from head 102 to slip ring 140. Slip ring 140 is supported upon shaft 64 as well as insulated from a shaft 64 and slip ring 142 by an electrically insulative insert 150. Slip ring 142 is positioned over an electrically conductive thrust bearing 152 which is journaled over shaft 64 and bears against boss 66. Electrical leads 154 and 156 are coupled respectively to brushes 144 and 146 for providing electrical communication from head 102 into instrumentalities within the recording-playback unit 24.

Referring to FIGS. 3 and 7, a drive arrangement for causing the rotation turntable 50 is portrayed. Power for causing this rotation is derived from an electrical motor 160 positioned within the unit 24. A drive pulley 162 is journaled over the drive shaft of motor 160 and is engaged with an endless belt 164. Belt 164 is passed over an idler pulley 166 to provide a 90 degree shift in its plane of motion. From idler pulley 166, endless belt 164 extends about the root periphery of a flywheel 168.

Inasmuch as turntable 50 is formed of a light plastic material, momentum to assure smooth or uniform rotational speed of the turntable is derived by forming the flywheel 168 of metal or similar higher mass material. For instance, flywheel 168 may be fabricated from copper or bronze. Additional advantage has been found to accrue from the use of a flywheel arrangement as a result of the more compact packaging available with its incorporation in the system. The relative positioning of flywheel 168 indicating the ideal compactness to the arrangement is shown by the outline of the flywheel 168 in the unit 24 illustrated in FIG. 2.

Fixed co-axially to flywheel 168 is a second drive pulley 170 having a diameter selected in relation to that of turntable 50 and to the rotational speed of motor 160 so as to achieve appropriate turntable rotational speed. Rotational power is transmitted from second drive pulley 170 to turntable 50 by an endless belt 172 passing over pulley 170 and the peripheral drive surface 54 of turntable 50. To avoid flutter effects occasioned by speed variations in turntable 50, it is desirable that endless belt 172 be fabricated of a flexible, but inelastic material. Endless belts formed from fiber reinforced materials are typical of those resistive of longitudinal elastic deformation.

OPERATION-ASSEMBLY

As described earlier, recording member 10 is inserted within the receiving chamber 22 of the record-playback unit by the simple procedure of lifting top cover 38 and placing record member 10 within the chamber in a manner wherein its outside edges abut against receiving chamber side walls 28, 30 and 32. Further, the record member 10 is inserted within chamber 22 so that spirally grooved track 16 faces into opening 35 and surrounding magnetic surface 14 is exposed within the side 36 of opening 35. When so placed within receiving chamber 22, rigid, transparent top cover 38 is closed permitting spring loaded latching member 42 to engage latching notch 44. Prior to placement of record member 10 within chamber 22, radial carriage assembly 82 will have been biased radially outwardly by helical spring 124 and rod 128. Carriage 82 will be limited in its outwardly directed movement by the engagement of stud 136 with an end of slot 134. As a consequence of this alignment, the pole piece tips 106 of head 102 will contact magnetic surface 14 at its outer periphery while follower pin 104 will engage the outermost entrance grooves within spiral track 16. Record member 10 and turntable 50 are additionally mutually configured such that the center of spiral track 16 is co-axially oriented with the axis of turntable 50 when record member 10 is inserted within unit 24.

Figure 5:
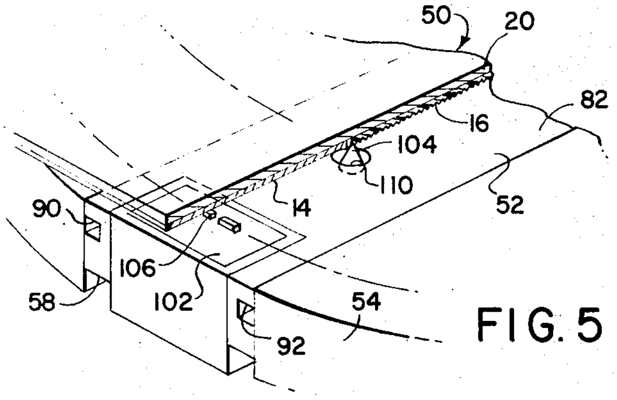
FIG. 5 is a fragmentary perspective view of portions of the recording member of FIG. 1 and recording-playback unit of FIG. 2 as they are joined in an operative association.

The foregoing orientation of record member 10 within receiving chamber 22 is more clearly illustrated in connection with FIG. 5. Note in this figure that follower pin 104 is engaged within an outermost groove of spiral track 16 and the pole tips 106 of head 102 are engaged with magnetic surface 16 along its outer periphery.

During either a recording or playback procedure, electrical instrumentalities within the unit 24 are activated to cause the energization of electrical motor 160 and the consequent rotation of turntable 50. As turntable 50 is rotated, follower pin 104 is drawn along the grooves of spiral track 16 to move carriage assembly 82 progressively inward toward the center of rotation of the turntable. As follower pin 104 rotates and the carriage assembly 82 is moved inwardly, the tips 106 of magnetic head 102 will rotate about surface 14 to define a corresponding spiral trace. In a recording mode, variations in inductance between the gap of pole tips 106 will cause the recordation of information along the spiral trace followed by head 102, and, in a playback mode, tips 106 will follow a previously recorded trace.

Registration between the pole tips 106 of magnetic head 102 and a previously recorded spiral trace in magnetic surface 14 is assured with the present apparatus. This registration is achieved by providing a unique controlling cam represented as spiral track 16 with each recording unit 10. By closely controlling the tolerance of the spacing between pole tips 106 and the follower pin 104, registration between the magnetic head and a magnetically recorded trace is assured with a high degree of reliability. Further, because the head-follower pin spacing can be accurately controlled with relative ease during high volume manufacturing procedures, any given recording member 10 can be played back by any randomly selected recording-playback unit 24.

Dimensional tolerance between the magnetic head 102 and the follower pin 104 are readily obtained with the instant arrangement in view of the relative simplicity of their mounting within head-follower assembly 100. As has been illustrated in connection with FIG. 6, assembly 100 is a simple plastic member within which head 102 and follower pin 104 are mounted. This mounting may be accomplished with cements such as epoxies or the like or the follower pin 104-head 102 mounting may be achieved coincidently to the plan moulding of plastic assembly 100. Those versed in the art will recognize that a simple mounting fixture is all that is required to achieve uniform and reliable spacing between the follower 104 and pole tips 106. Note further that with the arrangement thus described, only one relatively low tolerance assembly is required.

As has been described earlier, recording member 10 is fabricated having no compliant layer positioned intermediate plastic base portion 12 and magnetic surface 14. As a result, record units 10 may be fabricated at greatly reduced costs. Proper contact geometry is maintained between pole tips 106 and surface 14, however, through the use of relatively higher pressures of head 102 against surface 14. To accommodate for these increased pressures, bottom platform 34 is configured to closely surround the outer periphery of magnetic surface 14. Additionally, transparent top cover 38 is formed of rigid material which affords adequate surface to surface backing for record member 10. Accordingly, record member 10 is restrained from a flexure during the operation of unit 24. The provision of a transparent material for top cover 38 allows the user to observe an image recorded upon the outer face of photograph 20 during a recording procedure. As a consequence, data concerning the image may be obtained from the photograph itself during a recording procedure.

Following a recording procedure, latching member 42 is removed from notch 44, top cover 38 is lifted and record member 10 is removed. As the record member 10 is removed, helical spring 124 in cooperation with rod 128 will cause the carriage 82 to return to its radially extended position for subsequent recording or reading out of data.

Since certain changes may be made in the above system and apparatus without departing from the scope of the invention herein involved, it is intended that all matter contained in the above description or shown in the accompanying drawings shall be interpretered as illustrative and not in a limiting sense.

What is claimed is:

1. A magnetic sound recording and reproducing system for use in conjunction with a photograph comprising:

a recording member attachable to the back of said photograph, said recording member being substantially planar and incorporating a magnetic recording surface and a guide track formed cyclically about a given axis;

housing means including a receiving chamber for receiving and retaining said recording member and said photograph in a stationary position and a transparent cover for permitting viewing of said photograph when said recording member and said photograph are inserted into said housing means;

transducer means including a magnetic recording and playback head engageable with said recording surface when said recording member is in said receiving chamber, said recording surface being retained in said engagement with said magnetic recording and playback head by said transparent cover;

carriage means rotatable about said given axis and movable radially with respect thereto for supporting said recording and playback head;

drive means for rotating said carriage means about said axis;

follower means mounted upon said carriage means and engageable with said guide track when said recording member is retained within said housing means for governing the said radial movement of said carriage means so as to permit said magnetic recording and playback head to trace a recording upon said magnetic surface having a locus corresponding to said cyclical track, said follower means and said magnetic recording and playback head being mounted for simultaneous and codirectional movement and supported in a fixed spaced coplanar relationship by a unitary mounting assembly formed as part of said carriage means; and reset spring means for biasing said carriage means toward a precording position when said photograph and said recording member are removed from said receiving chamber thereby ending said engagement between said follower means and said cyclical guide track, said transparent cover being operative to retain said cyclical groove in engagement with said follower means when said recording member and said photograph are retained in said receiving chamber.

2. The magnetic sound recording and reproducing system of claim 1 in which said unitary mounting assembly, formed as part of said carriage means, is operative to bias said magnetic recording and playback head into engagement with said recording surface and being further operative to bias said follower means into engagement with said guide track when said photograph and said recording member are retained in said receiving chamber by said receiving chamber and said transparent cover.

3. The magnetic sound recording and reproducing system of claim 2 in which:

said photograph is oriented upwardly from said system for permitting viewing through said transparent cover;

said recording member is oriented downwardly toward said system;

said magnetic recording and playback head is oriented upwardly so as to engage said magnetic recording surface of said recording member; and said follower means is oriented upwardly to engage said cyclically grooved track of said recording member.

4. The magnetic sound recording and reproducing system of claim 3 in which said follower means is mounted upon said carriage means in predetermined spaced relationship from said magnetic recording and playback head.

5. The magnetic sound recording and reproducing system of claim 4 in which said magnetic recording and playback head is formed incorporating pole pieces engageable for inductive coupling with said magnetic recording surface; and said follower means is mounted upon said carriage means in predetermined spaced relationship from said pole pieces.

6. The magnetic sound recording and reproducing system of claim 5 wherein said follower means is mounted co-radially with said pole pieces upon said carriage means.

7. The magnetic sound recording and reproducing system of claim 1 in which:

said magnetic recording and playback head is formed incorporating pole pieces engageable for inductive coupling with said magnetic recording surface;

said guide track is formed as a continuous cyclical groove; and said follower means is formed as a follower pin movably engageable within said continuous groove.

8. The magnetic sound recording and reproducing system of claim 7 wherein said follower pin and said pole pieces are positioned substantially co-radially upon said carriage means with respect to said given axis.

9. The magnetic sound recording and reproducing system of claim 1 wherein said carriage means comprises:

a turntable mounted for rotation about said given axis within said housing means; and carriage assembly means movable radially with respect to said given axis upon said turntable for retaining said magnetic recording and playback head in predetermined spaced relationship from said follower means.

10. The magnetic sound recording and reproducing system of claim 1 in which said drive means comprises:

motor means for providing a rotational drive output;

a flywheel having a substantially higher inertial mass than said turntable and coupled in driven relationship with said motor means output; and means coupling said turntable in driven relationship with said flywheel.

11. The magnetic sound recording and reproducing system of claim 10 wherein said coupling means is provided as a longitudinally relatively inelastic endless belt attached in driving relationship about a portion of the periphery of said turntable and coupled in driven relationship with said flywheel.

* * * * *